United States Patent [19]
Ibe

[11] 4,380,168
[45] Apr. 19, 1983

[54] SODIUM LEAKAGE DETECTION SYSTEM AND METHOD OF CONTROLLING THE SAME

[75] Inventor: Hidefumi Ibe, Katsuta, Japan

[73] Assignee: Hitachi, Ltd., Tokyo, Japan

[21] Appl. No.: 167,029

[22] Filed: Jul. 9, 1980

[30] Foreign Application Priority Data

Jul. 12, 1979 [JP] Japan .................................. 54-87499

[51] Int. Cl.³ .............................................. G01M 3/18
[52] U.S. Cl. .................................. 73/40.5 R; 376/250
[58] Field of Search ........................ 73/40.5 R, 40, 23; 376/250

[56] References Cited

U.S. PATENT DOCUMENTS

| | | | |
|---|---|---|---|
| 2,777,812 | 1/1957 | Powell et al. | 73/40.5 R X |
| 3,245,269 | 4/1966 | Ivie | 74/3.54 |
| 3,721,116 | 3/1973 | Brachet et al. | 73/40 |
| 3,975,943 | 8/1976 | Brachet | 73/40 |
| 4,134,290 | 1/1979 | Bauerle | 73/40.5 R |

FOREIGN PATENT DOCUMENTS

| | | | |
|---|---|---|---|
| 52-46894 | 4/1977 | Japan | 73/40.5 R |
| 7409872 | 1/1976 | Netherlands | 73/40.5 R |

*Primary Examiner*—Anthony V. Ciarlante
*Assistant Examiner*—Joseph W. Roskos
*Attorney, Agent, or Firm*—Antonelli, Terry & Wands

[57] ABSTRACT

A plurality of sampling tubes are connected with a selector valve and the selector valve selects one of the sampling tubes so that the sample gas is lead through the selected sampling tube and a pipe way downstream of the selector valve to a leakage detection system. The pipe way is provided with a gas flushing section for flushing with high pressure gas and the gas flushing operation is performed before each change-over of the selector valve. The flow of sucked gas is kept constant by providing a gas flow control device downstream of the leakage detection section. A pressure sensor is provided for the pipe way leading to the detection section, to detect the gas pressure in the pipe way and the output of the pressure sensor is used to detect an abnormality occurring in the detection section inclusive of the pipe way thereto and also to correct the output of the pressure detector in the detection section.

11 Claims, 6 Drawing Figures

SODIUM LEAKAGE DETECTION SYSTEM AND METHOD OF CONTROLLING THE SAME

BACKGROUND OF THE INVENTION

This invention relates to a sodium leakage detection system and a method of controlling the same, the system detecting a leakage of sodium from piping and/or instruments inserted therein in a fast breeder reactor or other installations where a great amount of liquified sodium metal is used.

In fast breeder reactors now in practical use and still under development, liquified sodium metal is usually used as coolant. If such coolant leaks through cracks formed in a pipe or an instrumental part and is exposed to the atmosphere, the chemically active property of sodium offers a positive danger of fire breaking out. Further, corrosive substances produced due to the reaction of the leaked sodium on oxygen or moisture in the external atmosphere, accelerate the process of corrosion taking place in pipes or instrumental parts. And the enhanced corrosion may lead to an accidental, large-scale leakage and in an extreme case to a Loss of Coolant (LOC) accident. To prevent such as accident from taking place, cable type or spark-plug type leakage detectors are employed in the coolant circulation system. However, these types of leakage detectors operate on the phenomenon that the actually leaked sodium depositing on the detectors changes electrical conductivity in the detectors. Therefore, the detection is not possible unless a relatively large amount of sodium leaks. Needless to say, it is preferable to be able to detect a leakage while it is of a small quantity. For the purpose of detecting a leakage in the earlier stage, a sodium ionization detector (Japanese Patent Application No. 124172/78, U.S. patent application No. 83658) and a pressure difference detector (Japanese Patent Application No. 156462/78) have been proposed and are considered promising. In the application of these detectors, the gas surrounding the pipe or instrument of which the leakage is detected, is sampled and the sample gas is led to the detector so that sodium vapor or aerosol is detected. In the case of the pressure difference detector, a membrane filter is placed in the flow of gas and as the sodium aerosol suspended in the gas fill the micropores of the membrane filter, the difference between the gas pressures in front of and behind the filter increases. Accordingly, a leakage of sodium can be identified by detecting the pressure difference.

As described above, the surrounding gas sampling system is found more preferable for the detection of sodium leakage in the earlier stage, that is, while the leakage is still small. Further, in the case of a fast breeder reactor where several tens to several hundreds of leakage monitoring points are separately selected, the sampling system to be employed should preferably be of such a type as disclosed as an automatic sampling device in the U.S. Pat. No. 3,245,269 specification, in which a single leakage detector is provided for a plurality of leakage monitoring points and the desired samples of surrounding gas are selectively conducted into the detector through a change-over operation.

Even in this case, there are still some problems remaining to be solved. One of those problems is that since the gas samples from different monitoring points are successively taken into the detector, the present sample gas tends to be contaminated by the residual of the previous sample gas. Another problem is to exactly locate the position where an abnormal condition is detected in the leakage detection system and also to exactly judge whether the abnormal condition is due to sodium leakage or to the malfunction of detecting means.

SUMMARY OF THE INVENTION

One object of this invention, which has been made to solve the above problems, is to provide a system of detecting sodium leakage and a method of controlling the system, the system being so designed as to be almost free from adverse effects due to the residual of the previous sample gas.

Another object of this invention is to provide a sodium leakage detection system and a method of controlling the same, the system being able to locate the point at which an abnormal condition is detected and also to judge whether the output of the leakage detector is correct or erroneous.

According to this invention, there are provided a plurality of sampling tubes for sampling surrounding gas at various points along one or more sodium flow paths and for externally conducting the gas samples; a selector valve located at the gas exit ends of the plural sampling tubes, to selectively connect one of the gas exit ends of the sampling tubes with a pipe way leading to a detection system in a change-over manner; a sodium leakage detection system for taking in the sample gas sent through the sampling tubes and the pipe way and for detecting sodium leaked from the sodium piping and contained in the sample gas in vapor phase; and a flushing system for flushing the inner walls of the selector valve and the pipe way each time the connection between the sampling tube and the selector valve is changed over.

DESCRIPTION OF THE PREFERRED EMBODIMENT

Figure 1:
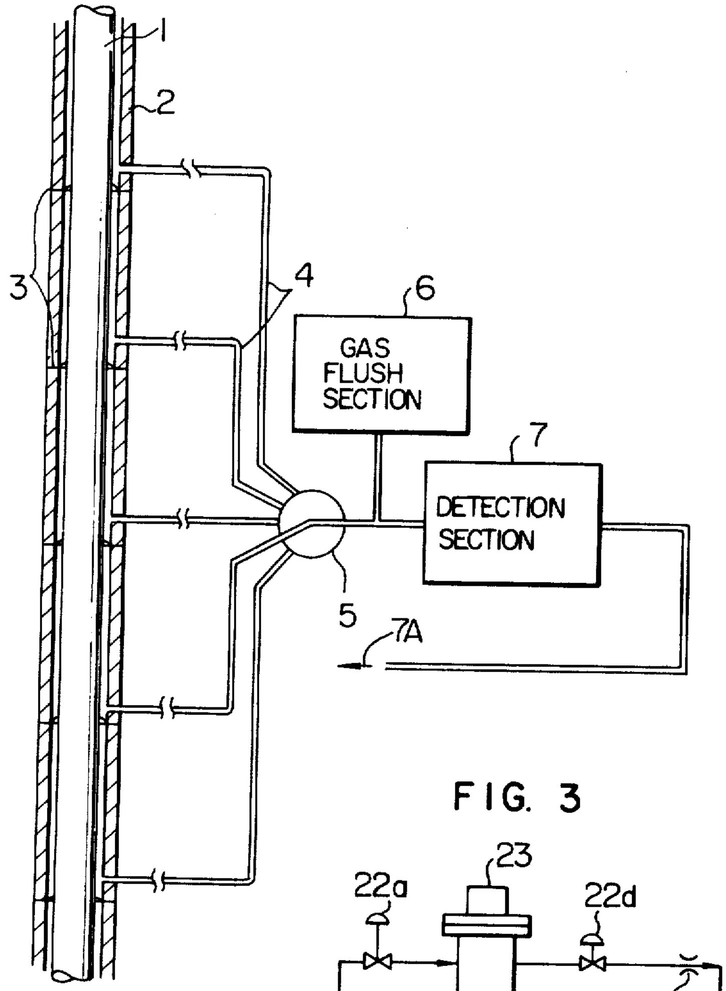
FIG. 1 schematically shows a multiple sampling system provided for sodium piping.

This invention will now be described by way of embodiment. FIG. 1 schematically shows a multiple sampling system applied to a sodium leakage detection system provided for a fast reactor. Sample gas is extracted from the annular space defined between a sodium pipe 1 and a heat generating sheath 2. The annular space is partitioned by spacers 3 into sub-spaces, i.e. sampling spaces, at intervals of several to several tens of meters along the axial length of the sodium pipe 1. If a sodium leakage occurs in a certain sampling space, the sample gas containing sodium aerosol is extracted from the sampling space and guided through a sampling tube 4 to a detection section 7. The selective connection of the detection section 7 with one of the sampling tubes 4, i.e. the selection of one of the sampling or monitoring channels, is performed by the change-over operation of a selector valve 5. In this type of flow path change-over mechanism, however, the residual of the gas conducted into the detection section 7 in the previous sampling cycles tends to contaminate or adversely affect the newly sampled gas led to the detection section 7. For the purpose of preventing such contamination, a gas flushing section 6 for injecting clean gas into the detection section after every sampling cycle is provided upstream of the detection section 7. This gas flushing section 6 serves also to remove any stopper that might occlude a sampling tube 4. The gas 7A ejected from the detection section 7 after the completion of leakage detection is conducted to a chamber which has a heat generating sheath therein. The gas may be contained also in a vessel or a housing fabricated especially for the discharged gas 7A. Anyway, the discharged gas 7A, which may contain substances harmful to the human body, must not be diffused into the surrounding air.

Figure 2:
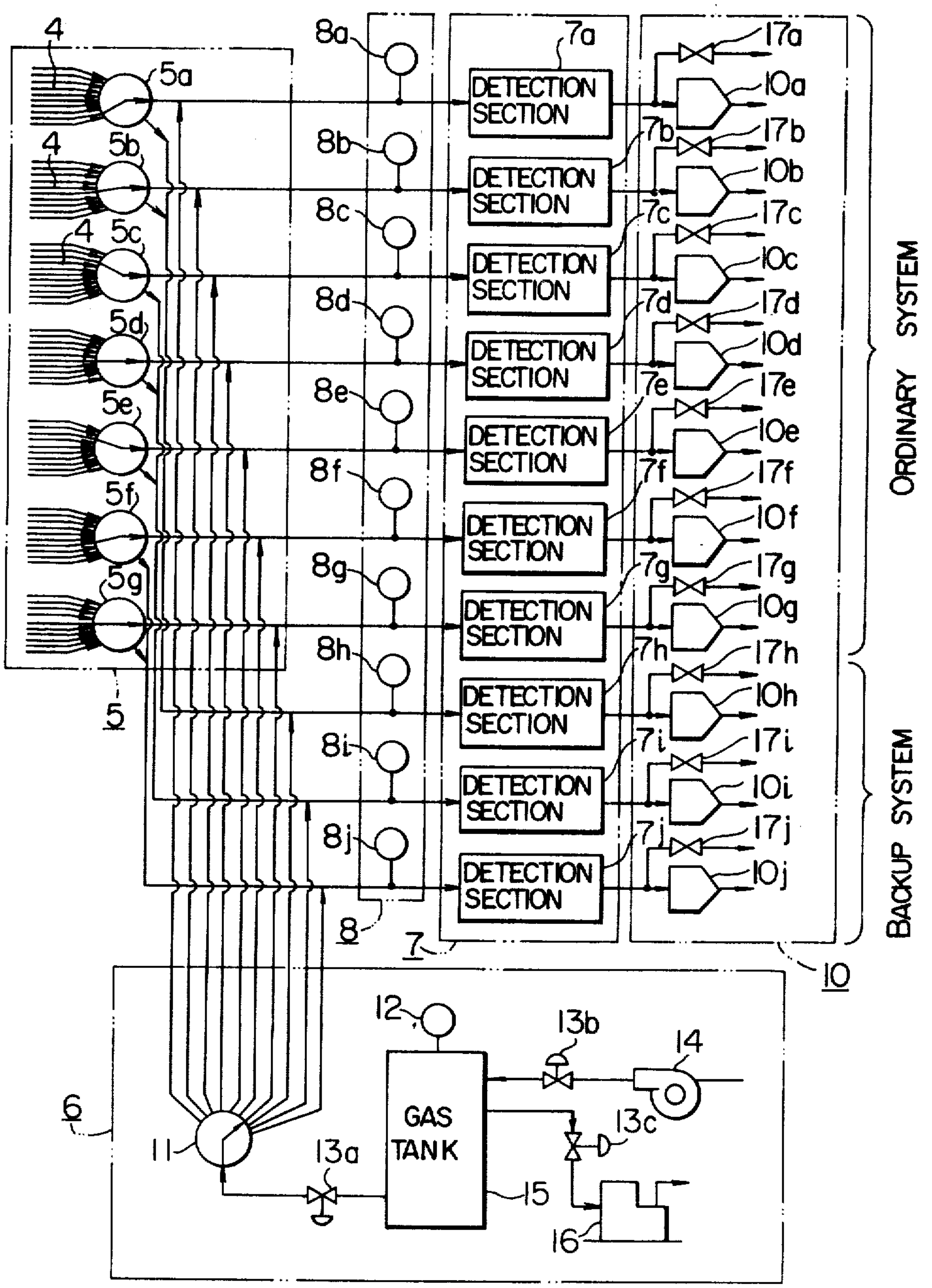
FIG. 2 schematically shows the constitution of an embodiment of a system for detecting a slight leakage of sodium.

FIG. 2 shows an embodiment of this invention, which a further developed version of the sodium leakage detection system shown in FIG. 1. The only difference of this embodiment from the system shown in FIG. 1 is that this developed system is applied to a practical case, e.g. a fast reactor, where sampling channels, i.e. detection points, number several tens to several hundreds. Therefore, in this embodiment, in stead of providing one selector valve and one detection section as in the system shown in FIG. 1, there are provided plural selector valves **5*a*, 5*b*, 5*c*, 5*d*, 5*e*, 5*f* and 5*g* and plural detection sections 7*a*, 7*b*, 7*c*, 7*d*, 7*e*, 7*f*, 7*g*, 7*h*, 7*i* and 7*j*. With the provision of plural selector valves, the number of the monitoring points per detector is reduced and the detection period defined as the duration from the moment of leakage occurring to the finish of detection can be shortened. Moreover, some improvements are introduced to meet the multiple point sampling scheme. The first improvement is to insert pressure sensors 8*a*, 8*b*, 8*c*, 8*d*, 8*e*, 8*f*, 8*g*, 8*h*, 8*i* and 8*j* upstream, with respect to gas flow, of the respective detectors 7. These pressure sensors check the soundness of the overall system and detect the erroneous operations of the detectors. The second improvement is to provide flow control devices 10*a*, 10*b*, 10*c*, 10*d*, 10*e*, 10*f*, 10*g*, 10*h*, 10*i* and 10*j* for rendering the gas flow to the respective detection sections constant, downstream of the detection sections. These flow control devices serve to compensate for the pressure losses of gas along the various lengths of pipes leading to the detection sections. The third is the provision of electromagnetic bypass valves 17*a*, 17*b*, 17*c*, 17*d*, 17*e*, 17*f*, 17*g*, 17*h*, 17*i* and 17*j* downstream of the detection sections. These bypass valves provide the bypass for flushing gas. The fourth is the division of the group consisting of the pressure sensors 8, the detection sections 7, the flow control devices 10 and the electromagnetic valves 17, into two subgroups, i.e. ordinary system and backup system. The members labeled a–g belong to the ordinary system and the members k–j to the backup system. With this constitution, even if the ordinary system fails, the backup system can be operated instead. The system shown in FIG. 2** will be described in detail below.

The flow of gas is controlled to a constant rate by the gas flow control devices 10. Each of these gas flow control devices consists of, for example, a pump. The gas flow is made constant by controlling this pump. If one of the sampling tubes 4 or the valves 5 is occluded by a stopper, the pressure of gas upstream of the associated gas flow control device 10 decreases. Accordingly, by monitoring the pressures of gas upstream of the gas flow control devices 10 by means of the pressure sensors 8, the occlusions of the sampling tubes 4 or the valves 5 can be detected. In the case where pressure difference detectors are used as the detection sections 7, check is always necessary of whether the change in the pressure difference is due to the change in the absolute pressure of gas or to the existence of sodium aerosol since the pressure loss over the membrane filter depends on the absolute pressure of the gas flowing thereacross. Such a change in the absolute pressure of gas is caused not only by the occlusion of the sampling section, as described above, but also by the change-over connection of the sampling tubes since the pressure losses of gas in the sampling sections upstream of the selector valves 5 differ from one sampling channel to another. It is therefore necessary to employ different warning levels for respective sampling channels or to render the pressure losses over the separate filters to corrected values on the basis of a reference pressure. The pressure sensors **8*a*–8*j* are provided to attain the various purposes as described above and the outputs of the pressure sensors 8** are sent through an A/D converter to an electronic computer so as to monitor the soundness of the overall system and to perform such numerical processing as described above.

In FIG. 2, a gas flush section 6 comprising a selector valve 11, electromagnetic valves **13*a*, 13*b* and 13*c*, a vacuum pump 16, pressurizing pump 14 and a gas tank 15, is not provided for each of the sub-systems each consisting of a selector valve 5, a detection section 9 and a gas flow control device 10, but shared by all the subsystems so as to make the overall system compact. If it is allowable to use a gas tank having a large volume or able to endure a high pressure, the selector valve 11 may be omitted and a manifold may be used instead so that all the sub-systems are flushed at a time. When the pressure sensor 8 detects an occlusion of the sampling tube 4 or the valve 5, gas flush is performed toward upstream of the selector valve 11 or the valve 13*a* is suddenly opened after the gas tank 15 has been evacuated to vacuum by the vacuum pump 16**, whereby the stopper can be removed. This is the overall view of the sampling system.

Figure 3:
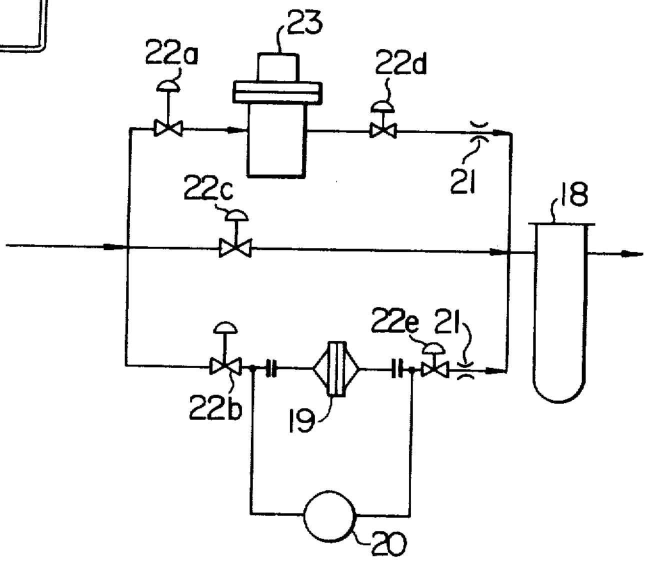
FIG. 3 shows an example of the layout of leakage detectors.

FIG. 3 shows an example of the detection section 7 used in each of the sub-systems described above, illustrating the arrangement of the housing 23 of a sodium ionization detector and the filter holder (housing) 19 of a pressure difference detector. The sodium ionization detector and the pressure difference detector are disposed parallel with respect to gas flow. The detection section 7 further comprises a pressure difference transmitter 20, electromagnetic valves **22*a*, 22*b*, 22*c*, 22*d* and 22*e*, a flow regulating nozzle 21 and a pressure sensor 12. The reason for the parallel use of these detectors is that the sodium ionization detector 23 is adapted for the detection of low-concentrated sodium while the pressure difference detector (19, 20) is effective in detecting high-concentrated sodium. If low-concentrated sodium or high-concentrated sodium, and not both, need to be detected, the desired one of the detectors should be provided. In such a case, the provision of both the detectors is superfluous. It should be noted here that the detectors 23 and (19, 20) must not be arranged in series with each other since the sodium ionization detector has a function of an electric dust collector and since the pressure difference detector, if placed downstream of the sodium ionization detector, will play no effective role. An aerosol collector 18 is provided to protect the gas flow control device downstream thereof. When gas flush is performed, the electromagnetic valve 22b is closed to protect the membrane filter in the holder 19. When the electrode placed in the housing 23 of the sodium ionization detector loses it function, or when the filter in the holder 19 fails, the replacing operation is performed with the manual valves 22a and 22d, or 22b and 22e closed and with the manual valve 22c** open.

Figure 6:
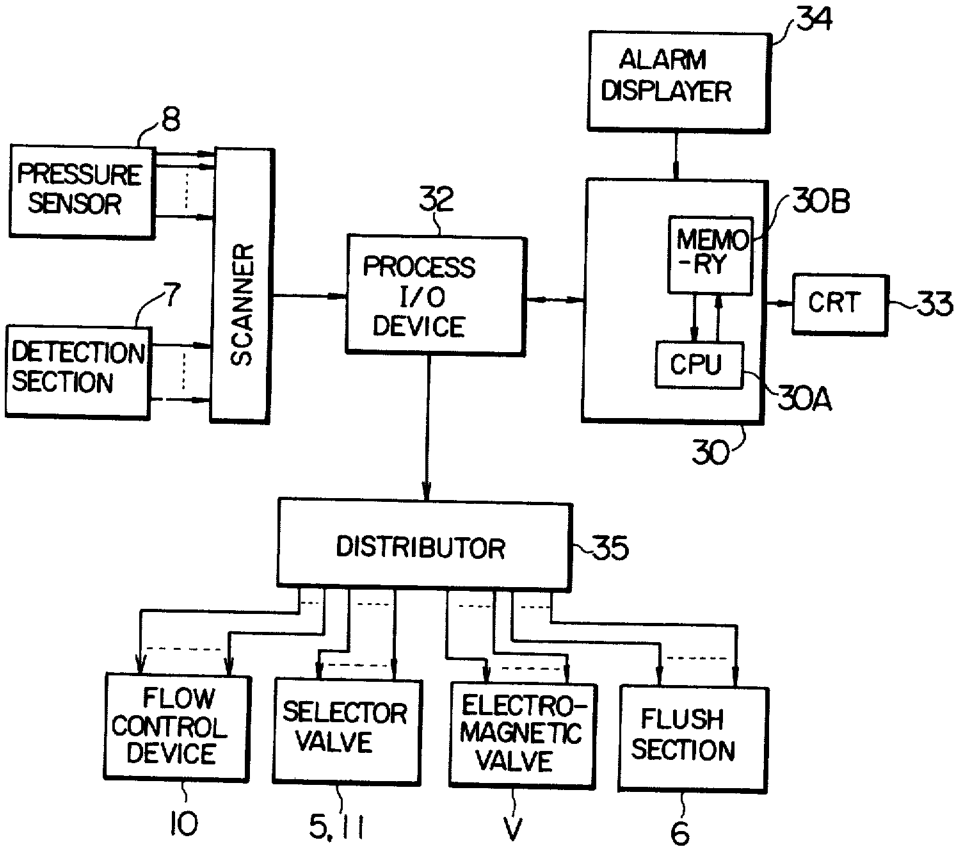
FIG. 6 shows an example of a system diagram for computer control.

In the sodium leakage detection system described above, the operations of the various detectors and valves become more difficult with the increase in the complexity of the system. Therefore, a computer is useful in processing the operations. FIG. 6 shows such a system as aiming at computer control. In FIG. 6, a computer 30 transmits data to and receives data from, a process I/O (input/output) device 32. The external data inputs to the process I/O device 32 are the detected pressure (the output of the pressure difference detector 20) sent from the pressure sensor 8 and the detection section 7 and the output of the sodium ionization leakage detector 23. These outputs are sequentially received through a scanner 31. The output of the I/O device 32 is read into the computer 30 and used for various processings described later. The outputs of the computer 30 are sent, depending on the processed results and control items, to a distributor 35 through the I/O device 32. The distributor 35 distributes the outputs of the computer 30 properly to constituent members. These constituent members are flow control devices 10, selector valves 5 and 11, electromagnetic valves V and flush section 6. There is also other input/output data but they are omitted from the figure for simplicity. The computer consists mainly of a CPU 30a and a memory 30B. Moreover, the computer 30 actuates a displayer 34 for alarm displaying and a cathode ray tube (CRT) 33. The displayer 34 and the CRT 33 may be driven via the I/O control device 32. Further, the computer 30 has an operator console (not shown) for man-machine control, the console being used for a variety of input operations.

Figure 4:
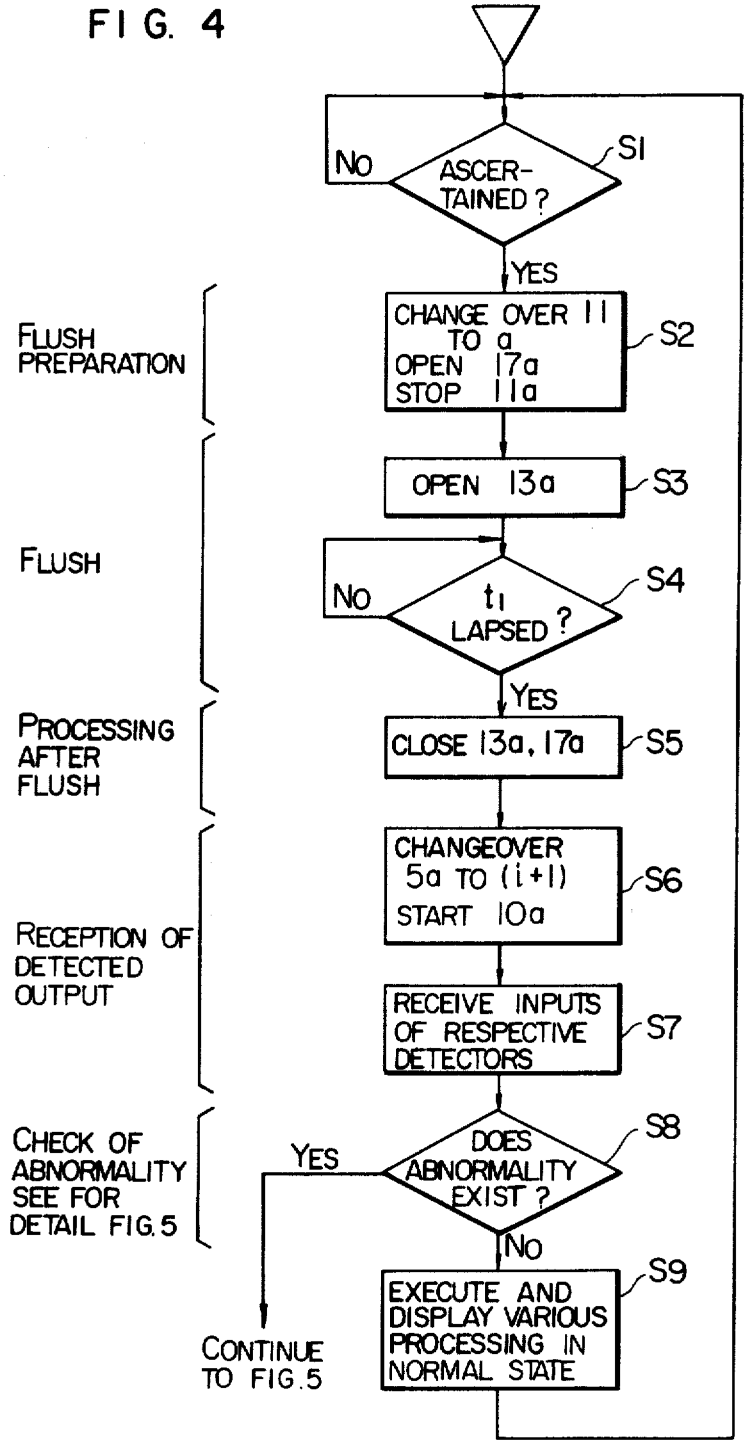
FIG. 4 is a flow chart illustrating the control operation of the leakage detection system in the normal state.

FIG. 4 illustrates the principle of controlling the leakage detection system shown in FIG. 2 in accordance with the output of the computer-aided system shown in FIG. 6 and the principle of checking various abnormalities on the basis of the detector output derived from the leakage detection system. The flow chart shown in FIG. 4 corresponds to the control and measurement of a single sub-system (labeled with index a) and is also applicable to the other sub-systems.

Reference should first be made to FIG. 2. It is there assumed that since the pressurizing pump 14 in the gas flush section 6 has been started, the pressure sensor 12 provided for the gas tank 15 indicates a pressure high enough for gas flush and that the valve 13a is closed to be ready for gas flush. It is also assumed in the sub-system labeled with index a that the bypass valve 17a is closed while the gas flow control device 10a is at operation and that the sampling valve 5a is connected with the i-th sampling tube 4 and the leakage detection operation on the i-th sampling channel is finished. For leakage detection operation on the (i+1)th sampling channel under these circumstances, check is first made of whether the output of the pressure sensor 12 is at a sufficiently high level, in step S1. In steps S2, S3, S4 and S5, gas flushing operation is performed. In the step S2 for a preparatory processing, the selector valve 11 is operated to select the sub-system a, the bypass valve 17a is opened and the gas flow control device 10a is stopped. The opening of the valve 17a and the stopping of the device 10a is necessary for the protection of the pump provided in the device 10a. In the step S3, the valve 13a is opened and high pressure gas is caused to flow through a path 13a-11-7a-17a whereby sodium deposited on various parts of the detection section at the previous samplings is discharged. Accordingly, detection error due to residual sodium can be eliminated and the detection can be made with a high precision. Needless to say, the system is so designed as to prevent sodium in vapor phase from being directly discharged into ambient air. In the step S4, whether the gas flush continued for over a constant period $t_1$, is checked and thereafter in the step S5 for the post-flush processing, the valves 13a and 17a are closed.

After the above flush processing, the (i+1)th sampling tube 4 is selected by the selector valve 5a and the flow control device 10a is started in step S6. The gas flow control device 10a serves to render gas flow constant. Sample gas is extracted from the (i+1)th compartment of the annular space shown in FIG. 1 and led to the detector 7a. In step S7, the outputs of the pressure sensor 8a, the detectors 20 and 23 are initially received. This reception of these outputs is performed after the ascertainment of the gas flow having reached a stability after the gas flush.

Figure 5:
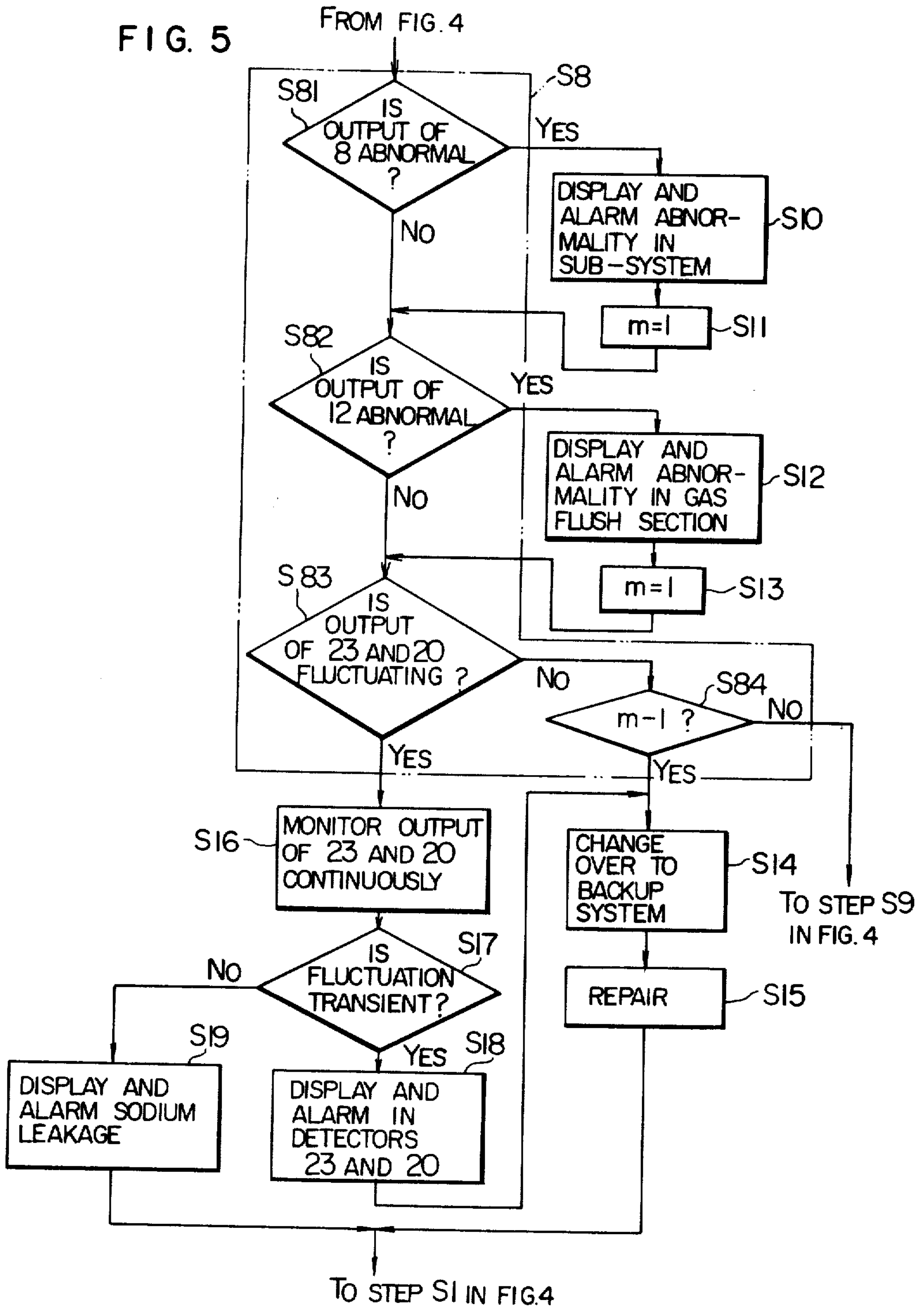
FIG. 5 is a flow chart illustrating the processing operation of the system in the abnormal state.

In step S8, check is made of whether there is an anomalous condition in each sub-system, gas flush section or leakage detection section, or not, and if there is an anomalous condition, the abnormality detection processing program shown in FIG. 5 is executed. On the other hand, if there is no abnormality, various processings depending on input values are executed to display the processed results on the CRT (FIG. 6), in step S9.

As described above, the processing operation on the (i+1)th sampling channel in the normal state is finished and in like manner a processing operation is executed on the (i+2)th sampling channel. The other sub-systems are quite similarly processed and those processings are executed in a time sequential manner by inserting instructions and supplying inputs in the interstep intervals in the processing of the sub-system a.

FIG. 5 is a flow chart illustraing in detail the abnormality check processing in the step S8 and the following processings. The abnormality check processing enclosed by dashed line consists of steps S81, S82, S83 and S84. In the step S81, imaginable abnormalities occurring on a sub-system and therefore disordering the system shown in FIG. 2, abnormalities on a gas flushing section and abnormalities on a detection section are detected with these three different kinds of abnormalities classified. Among the abnormalities occurring in the sub-system are those due to an occlusion of a sampling tube and the malfunctioning of the valve 5 and/or 17 and the gas flow control device 10. These abnormalities can be detected by the pressure sensor 8 shown in FIG. 2. In the step S81, these abnormalities are detected from the abnormal output of the pressure sensor 8 and in step 10 the alarm indicating that the sub-system is in abnormal condition, is displayed. In step 11, a flag m=1 is set, this flag representing the storage of an abnormality being present. Among abnormalities occurring in the gas flushing section are those due to the malfunctions of the valve, the pressurizing pump and the vacuum pump. These abnormalities can also be detected by the pressure sensor 12 shown in FIG. 2. In the step 82, these abnormalities are detected by detecting the abnormal output of the pressure sensor 12. In step S13, the alarm that an abnormality has occurred, is given while it is displayed. In the step S13, a flag m=1 is set. Finally, among the abnormalities occurring in the detection section are the breakdowns of the electrodes of the sodium ionization detector 23 and the filter of the pressure difference detector (19, 20). These abnormal conditions cause fluctuations in the output signal from the detector. For example, as the pressure of gas against the filter decreases, the output of the pressure difference detector (19, 20) increases temporarily. When the electrodes of the sodium ionization detector are short-circuited, an output having a pulse waveform appears. Therefore, by detecting these anomalous signals, abnormalities occurring in the detector can be detected. It is noted that check should be made of whether the fluctuation in the signal is a spurious one due to the abnormality in the detector or it is the real one due to a leakage of sodium. Since the fluctuation due to the abnormality in the detector is only transient, a distinction can be drawn between the spurious and the real fluctuation by effecting a continuous monitoring for over a certain period of time. In step S83, the change in the detector output is monitored. If there is no output change and if m=0 as a result of a check by flag m in step S84, then no abnormalities are found in the whole system and hence no leakage is detected, the result of check being "normal". In this case, the processing in the normal state, coming after the step S9 in FIG. 4, is reached. In the step S84, if m=1, the system is changed over to the backup system (step S14) to be instructed that it should be repaired (step 15). For example, in the case of the sub-system a, the exit port of the selector valve 5*a* is changed over to the detection section 7 of the backup system and thereafter the selected detection section 7 is used as if it belongs to the ordinary system, until the sub-system is repaired. In the case where an abnormality occurred in the exit side of the selector valve 11 in the gas flushing section 6, the abnormality can be eliminated by connecting the exit port of the selector valve 5*a* to a detection section 7 of the backup system. In some cases, an abnormality may occur in such a position that gas flush cannot eliminate the cause of the abnormality. In those case, if the gas flushing section is designed in a multiplex constitution and if the backup system is connected in the case of the malignant abnormality, then the problem of abnormality can be solved. If the fluctuation of the output of a leakage detector is found in the step S84, the fluctuation is continuously monitored for a predetermined period of time (step 16). In step S17, a distinction is drawn between long fluctuation and transient one and if the fluctuation is deemed to be transient, the display and alarm that the leakage detector is in abnormal condition is given (step S18) and thereafter the processings belonging to the steps S14 and S15 are executed. In this case, as with an abnormality in a sub-system, change-over to the backup system is effected to cause the detector to be instructed for repair. The following detection is performed through the channel b (7*b*, 8*b*, 10*b*, 17*b*) of the backup system and after the processing belonging to the step S15 has been finished, the step S1 in FIG. 4 is reached to continue the detection through the channel b. In the case of a long fluctuation being detected, since this fluctuation is due to sodium leakage from the sodium piping, the display and alarm that sodium has leaked out is given in step S19. If the amount of leakage is relatively large, the reactor is shut down for the repair of the leak point. After the processing in the step 19, the step S1 in FIG. 4 is resumed to monitor leakage through another sampling channel. In the step S83, whether the output of the pressure difference detector 20 is erroneous or not should be checked in view of the absolute pressure as the output of the pressure detector 8*a*. Namely, as described above, since the pressure loss across the detector housing 19 depends on the absolute pressure of the flowing gas, the output of the detector 20 should be corrected to a value for comparison with respect to the reference absolute value.

As described in detail above, according to this invention, the gas flushing section is provided to flush every sub-system before the associated sample gas is received by the leakage detector in the sub-system so that the contamination of the sub-system due to the residual sodium in the previous sampling operation is completely eliminated. Further, by providing pressure detectors respectively for each sub-system and the gas flushing section and by monitoring the outputs of the pressure detectors, the location of a leak point can be effected. Moreover, by monitoring the output of the leakage detector over an appreciably long period, check can be made of whether the fluctuation of the output of the leakage detector is due to leakage of sodium or not.

As described above, according to this invention, the reliability and the precision of measurement can be improved with a simple system constitution, in the case where leakage is to be detected by extracting samples of gas from numerous sampling points.

I claim:

1. A sodium leakage detection system comprising:
at least one sodium flow path;
a plurality of first sampling tubes for sampling surrounding gas at various points along said at least one sodium flow path and for conducting gas samples obtained at said various points away from said flow path;
a selector valve located at the gas exit ends of said plurality of first sampling tubes for selectively connecting one of said gas exit ends of said first sampling tubes with a second sampling tube;
said second sampling tube being connected to said selector valve for leading a sample gas passed through the selected one of the first sampling tubes to a sodium leakage detector section;
said sodium leakage detection section including means for detecting sodium leaked from the sodium flow path and contained in the sample gas in the vapor phase, said means including a pressure difference detector for detecting a difference between gas pressures before and after a filter disposed in a gas sample flow path within said detection section and a sodium ionization detector, disposed in parallel with said pressure difference detector with respect to said gas sample flow path, for determining the content of sodium ion contained in the sample gas; and
a flushing section for flushing inner walls of said selector valve and said second sampling tube each time the connection between one of said sampling tubes and said selector valve is changed over.

2. A sodium leakage detection system according to claim 1, further comprising a first pressure sensor provided in said second sampling tube between said selector valve and said sodium leakage detection section, for checking the pressure of gas upstream of said sodium leakage detection section; and a gas flow control device provided downstream of said sodium leakage detection section, for controlling the flow of gas passed through said selector valve to a constant value.

3. A sodium leakage detection system according to claim 2, wherein said sodium leakage detection section further includes a pressure detector upstream of said filter in said gas sample flow path and means for correcting the output of said pressure difference detector or the preset level for alarm in accordance with the output of said pressure detector.

4. A sodium leakage detection system according to claim 1, further comprising gas flow control means provided downstream of said sodium leakage detection section, for controlling the flow of gas passed through said selector valve to a constant value and a bypass valve provided in parallel with said gas flow control means.

5. A sodium leakage detection system according to claim 4, wherein said flushing section can be operated even when a foreign matter is present in said first sampling tubes and/or said second sampling tube leading to said leakage detection section.

6. A sodium leakage detection system according to claim 1, wherein after the selector valve has been connected with an i-th first sampling tube and the leakage detection has been completed, said flushing section flushes said i-th first sampling tube and said second sampling tube connected therewith and thereafter said selector valve is connected with an (i+1)th first sampling tube by change-over operation so that sodium leakage detection is performed through said (i+1)th first sampling tube.

7. A sodium leakage detection system according to claim 4, wherein after the selector valve has been connected with an i-th first sampling tube and the leakage detection has been completed, the operation of said flow control means is stopped and the associated bypass valve is opened so that said flushing section flushes said i-th first sampling tube and said second sampling tube connected therewith and thereafter said bypass valve is closed, said selector valve is changed over to an (i+1)th first sampling tube and said gas flow control means is started, so that the leakage detection is performed through said (i+1)th first sampling tube.

8. A sodium leakage detection system according to claim 2, wherein said flushing section is provided with a second pressure sensor for detecting the pressure of gas in said flushing section.

9. A sodium leakage detection system according to claim 8, wherein an abnormality in said detection section is distinguished from that in said flush section by respectively detecting the abnormal outputs of said first and second pressure sensor.

10. A sodium leakage detection system according to claim 3, wherein if the corrected output of said pressure difference detector has an abnormal value, the abnormal output is continuously monitored and the abnormality in said pressure difference detector is distinguished from that due to sodium leakage, depending on the mode of the fluctuation of said abnormal output.

11. A sodium leakage detection system according to claim 1, wherein if said sodium ionization detector delivers an abnormal output, the abnormal output is continuously monitored and thereby the abnormality in said sodium ionization detector is distinguished from that due to the leakage of sodium, depending on the mode of the fluctuation of said abnormal output.

* * * * *